United States Patent
Wang et al.

(10) Patent No.: US 9,639,124 B2
(45) Date of Patent: May 2, 2017

(54) CARRIER FOR HARD DISK DRIVE

(71) Applicant: HON HAI PRECISION INDUSTRY CO., LTD., New Taipei (TW)

(72) Inventors: Hung-Yuan Wang, New Taipei (TW); Cheng-Wei Lin, New Taipei (TW); Kuo-Feng Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/829,600

(22) Filed: Aug. 18, 2015

(65) Prior Publication Data

US 2017/0052572 A1     Feb. 23, 2017

(51) Int. Cl.
*A47B 91/00*     (2006.01)
*G06F 1/18*      (2006.01)
*G11B 33/02*     (2006.01)

(52) U.S. Cl.
CPC ............ *G06F 1/187* (2013.01); *G11B 33/027* (2013.01)

(58) Field of Classification Search
CPC .............................. G06F 1/187; G11B 33/027
USPC ............. 248/310, 313, 316.4, 316.8, 346.03, 248/346.06, 346.07; 361/679.4; 220/8
See application file for complete search history.

(56) References Cited

U.S. PATENT DOCUMENTS

| | | | | |
|---|---|---|---|---|
| 4,136,805 A * | 1/1979 | Storms | ...................... | A45F 5/00 224/219 |
| 4,216,927 A * | 8/1980 | Byrd | ...................... | B64D 9/00 220/1.5 |
| 5,016,772 A * | 5/1991 | Wilk | ................... | B65D 21/086 220/495.01 |
| 5,664,367 A * | 9/1997 | Huang | ................... | A47G 7/044 248/311.2 |
| 2003/0218113 A1* | 11/2003 | Sullivan | ................ | F16M 11/22 248/346.07 |
| 2005/0194287 A1* | 9/2005 | Lien | ..................... | H05K 7/1489 206/565 |

* cited by examiner

*Primary Examiner* — Gwendolyn Baxter
(74) *Attorney, Agent, or Firm* — Steven Reiss

(57) ABSTRACT

A carrier includes a frame defining a first space configured to accommodate a first type of hard disk drive, and an adjusting mechanism slidably coupled to the frame. The adjusting mechanism is transitionable between: (i) a first configuration in which the adjusting mechanism is located outside the first space defined by the frame, and (ii) a second configuration in which the adjusting mechanism is located inside the first space, the adjusting mechanism and the frame cooperatively define a second space configured to accommodate a second type of hard disk drive different from the first type of hard disk drive.

13 Claims, 6 Drawing Sheets

CARRIER FOR HARD DISK DRIVE

FIELD

The present disclosure relates to carriers in electronic devices, and more particularly to a carrier for hard disk drive.

BACKGROUND

Electronic devices generally apply carriers for hard disk drives. A typical carrier generally carries one type of hard disk drive.

DETAILED DESCRIPTION

Figure 1:
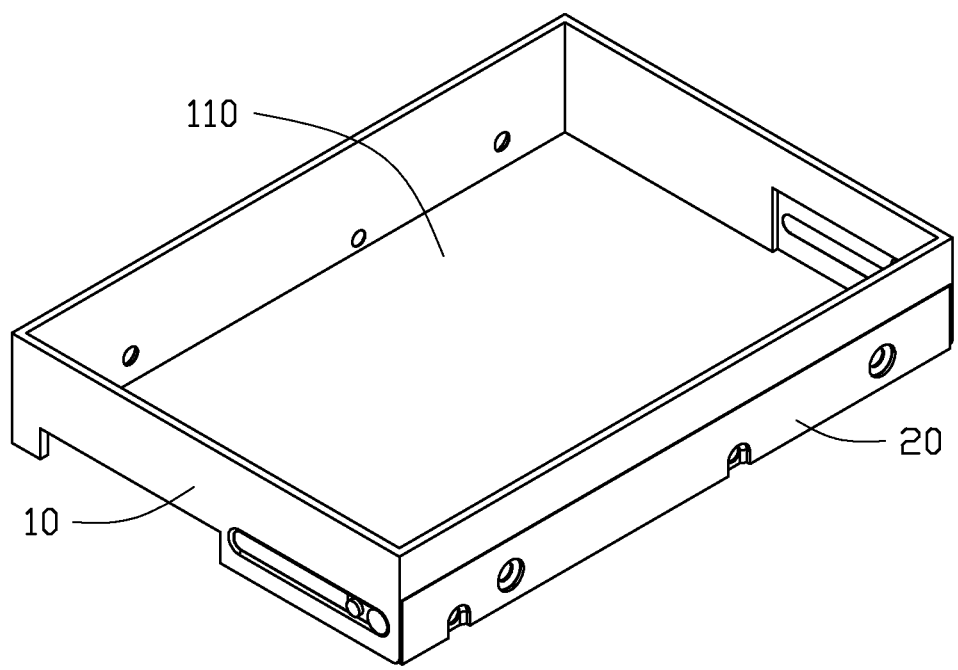
FIG. 1 is an assembled, isometric view of a carrier in a first configuration in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a carrier for hard disk drive. The carrier includes a frame defining a first space configured to accommodate a first type of hard disk drive, and an adjusting mechanism slidably coupled to the frame. The adjusting mechanism is transitionable between: (i) a first configuration in which the adjusting mechanism is located outside the first space defined by the frame, and (ii) a second configuration in which the adjusting mechanism is located inside the first space, the adjusting mechanism and the frame cooperatively define a second space configured to accommodate a second type of hard disk drive different from the first type of hard disk drive.

Figure 2:
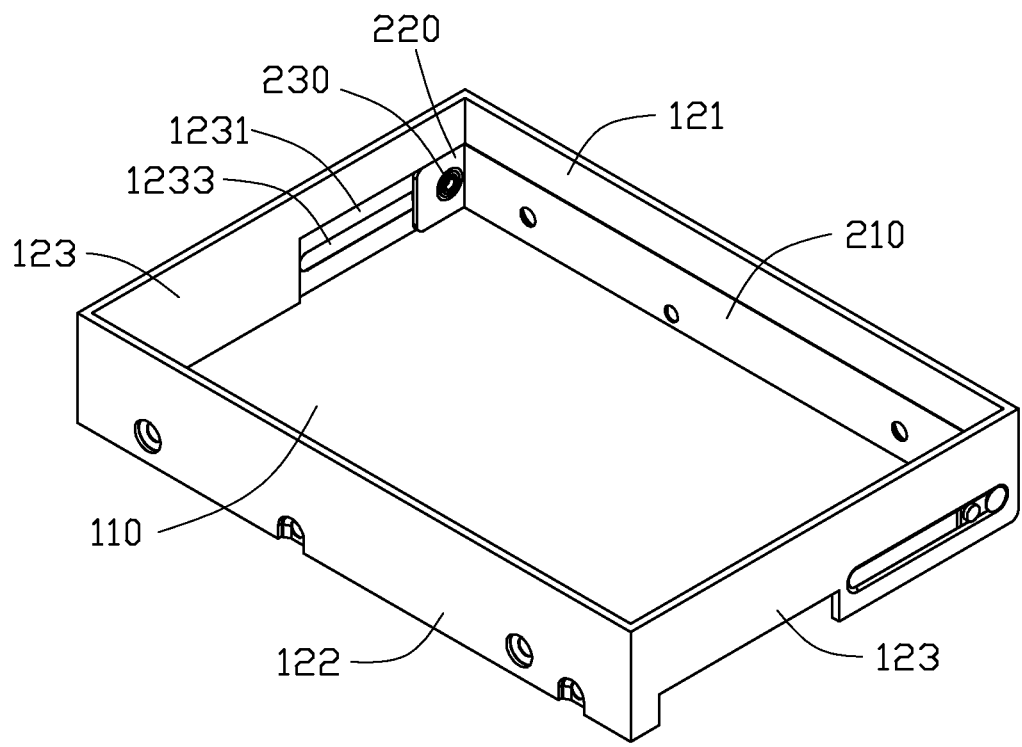
FIG. 2 is another assembled, isometric view of the carrier in FIG. 1 viewed from a different angle.

Referring to FIG. 1 and FIG. 2, a carrier 1 for installing a first type of hard disk drive in accordance with an embodiment is illustrated. The carrier 1 includes a frame 10 and an adjusting mechanism 20 slidably coupled to the frame 10.

The frame 10 defines a first space 110 configured to accommodate the first type of hard disk drive. The frame 10 includes a plurality of interconnecting walls surrounding the first space 110. In this embodiment, the frame 10 can be in a shape of substantially rectangular case. The walls can include two opposite coupling walls 123, a connecting wall 121 located between and connecting the two coupling walls 123 and another connecting wall 122 opposite to the connecting wall 121 and connecting the two coupling walls 123.

Figure 3:
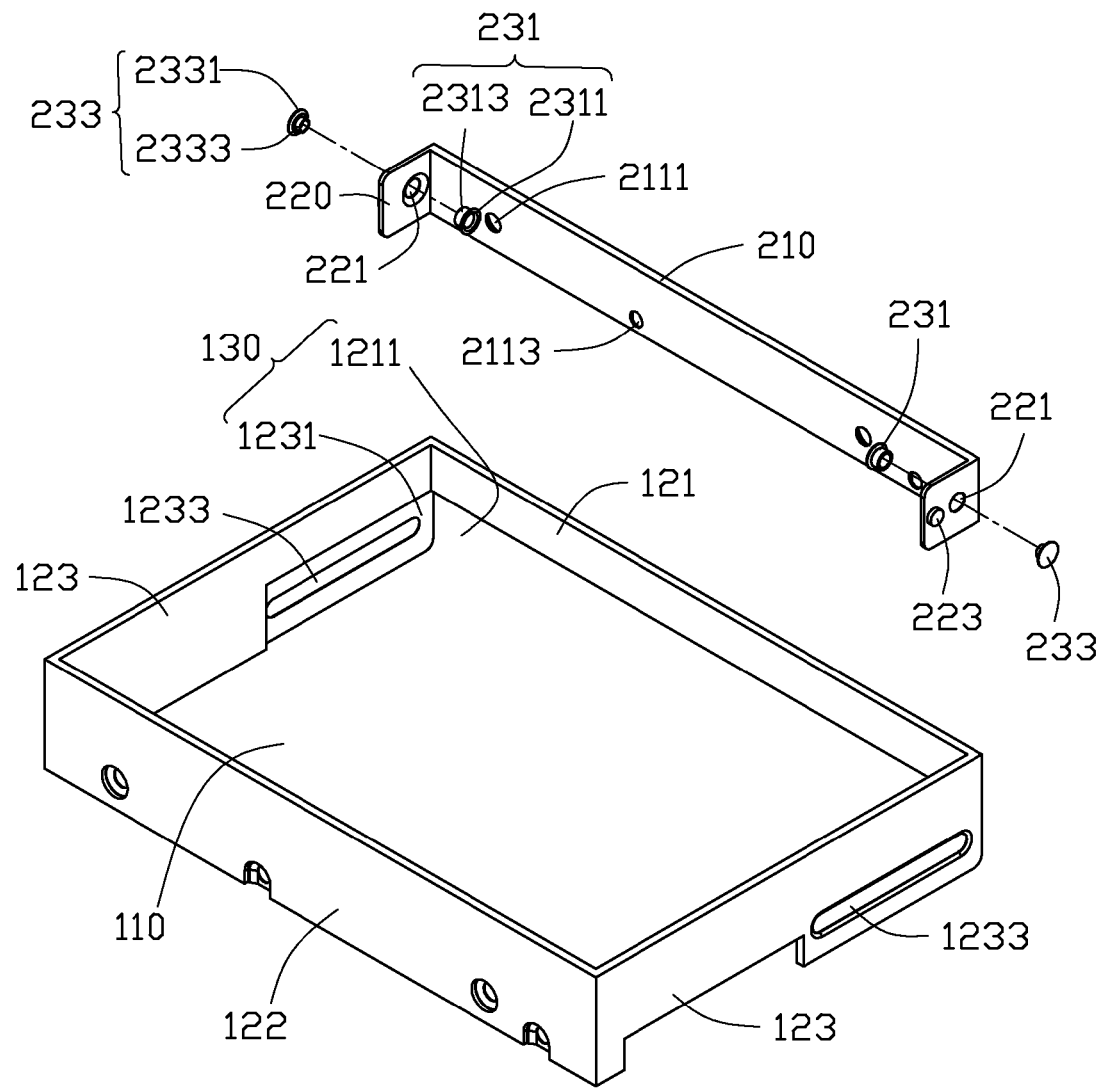
FIG. 3 is exploded, isometric view of the carrier in FIG. 2.

Referring to FIG. 3, the connecting wall 121 defines a receiving room 1211. The coupling walls 123 each form a recess 1231 adjacent to the connecting wall 121. The recesses 1231 and the receiving room 1211 cooperatively define a receiving space 130 configured to accommodate the adjusting mechanism 20. In this embodiment, the recesses 1231 and the receiving room 1211 can be defined in side portions of the coupling walls 123 and the connecting wall 121. The recess 1231 and the receiving room 1211 are exposed outwards at the side portions of the coupling walls 123 and the connecting wall 121. The two coupling walls 123 each can further define a groove 1233 extending through the coupling walls 123 in the recess 1231, configured to engage the adjusting mechanism 20. The groove 1233 has a first end adjacent to the receiving room 1211 of the connecting wall 121 and a second end remote from the receiving room 1211. The first end and the second end of the groove 1233 can be in a same level.

The adjusting mechanism 20 includes an installing portion 210 configured to install a hard disk drive, two coupling portions 220 extending from two opposite ends of the installing portion 210, and two retainers 230 configured to be coupled to the coupling portions 220 and the coupling walls 123.

The installing portion 210 can define two types of installing holes including two first types of installing holes 2111 and two second types of installing holes 2113 configured to install two types of hard disk drives, respectively. Each of the two coupling portions 220 can define a through aperture 221 configured to receive the retainer 230. In this embodiment, the through aperture 221 can be in a shape of circular truncated cone. That is the through aperture 221 includes a first end larger than a second end thereof. Each of the coupling portions 220 can form a protrusion 223 configured to be coupled to a corresponding groove 1233 of the coupling wall 123.

Each retainer 230 can include a sleeve member 231 and a pin member 233 configured to engage the sleeve member 231. The sleeve member 231 can include a first head portion 2311 configured to abut the coupling portion 220 and a sleeve portion 2313 extending from the first head portion 2311. The pin member 233 includes a second head portion 2331 configured to abut the coupling wall 123, and a pin portion 2333 extending from the second head portion 2331 and configured to engage in the sleeve portion 2313.

In assembly of the carrier 1, the two coupling portions 220 can be received in the two recesses 1231 of the two coupling walls 123, respectively. Each coupling portion 220 has the protrusion 223 thereof received in the corresponding groove 1233 of the coupling wall 123. The sleeve member 231 has the sleeve portion 2313 extending through the through aperture 221 of the coupling portion 220 and slidably received in the groove 1233, and has the first head portion 2311 abutting the coupling portion 220 in the first end of the through aperture 221. The pin member 233 has the pin portion 2333 extending into the groove 1233 and engaging in the sleeve portion 2313 of the sleeve member 231, and has the second head portion 2331 abutting the coupling wall 123. Therefore, the sleeve member 231 and the pin member 233 retain the coupling portion 220 with the coupling wall 123. The coupling portion 220 and the corresponding coupling wall 123 are located between the corresponding first head portion 2311 and the corresponding second head portion 2331. Therefore, the adjusting mechanism 20 is slidably coupled to the frame 10.

Figure 4:
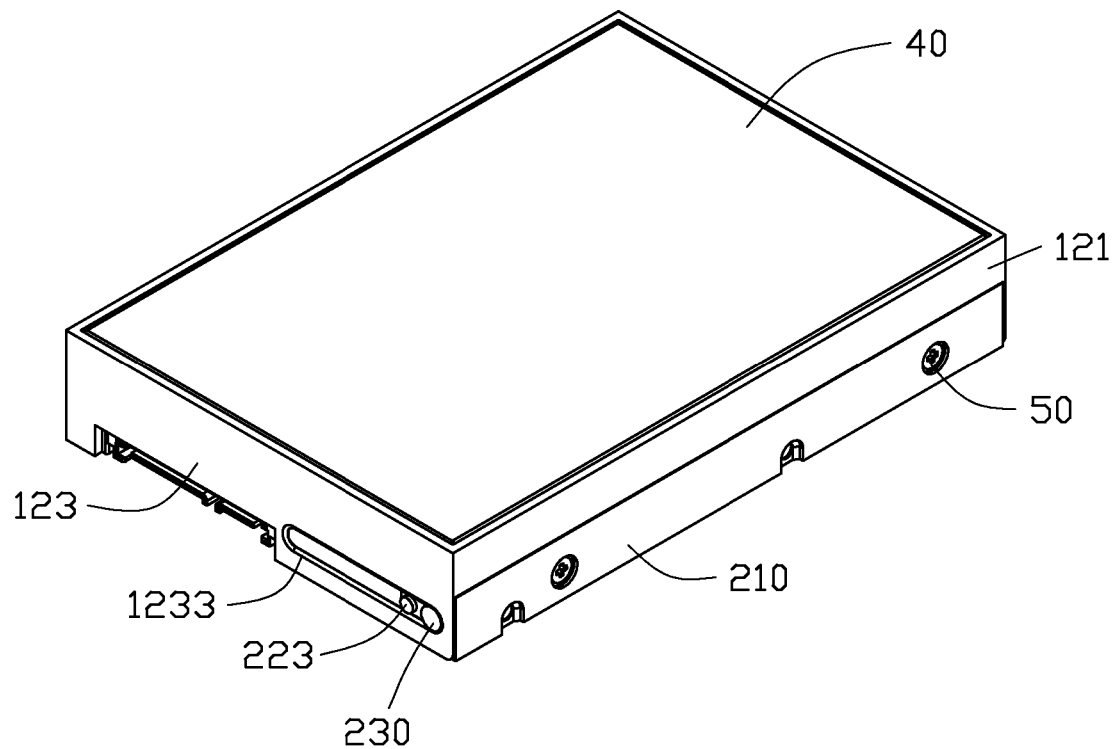
FIG. 4 is an assembled, isometric view of the carrier in FIG. 1 with a hard disk drive installed in the carrier.

Referring to FIG. 2 and FIG. 4, the carrier 1 is illustrated in a first configuration for carrying a first type of hard disk drive 40. The adjusting mechanism 20 is received in the receiving space 130 of the frame 10. The installing portion 210 of the adjusting mechanism 20 can be located under the connecting wall 121 of the frame 10. In the first configuration, the adjusting mechanism 20 is located outside the first space 110 defined by the frame 10. The adjusting mechanism 20 and the frame 10 cooperatively surround the first space 110 and accommodate the first type of hard disk drive 40 in the first space 110. Two bolts 50 can extend through the two first type of installing holes 2111 of the installing portion 210 to engage with the first type of hard disk drive 40. Therefore, the first type of hard disk drive 40 is installed in the first configuration cooperatively defined by the frame 10 and the adjusting mechanism 20.

Figure 5:
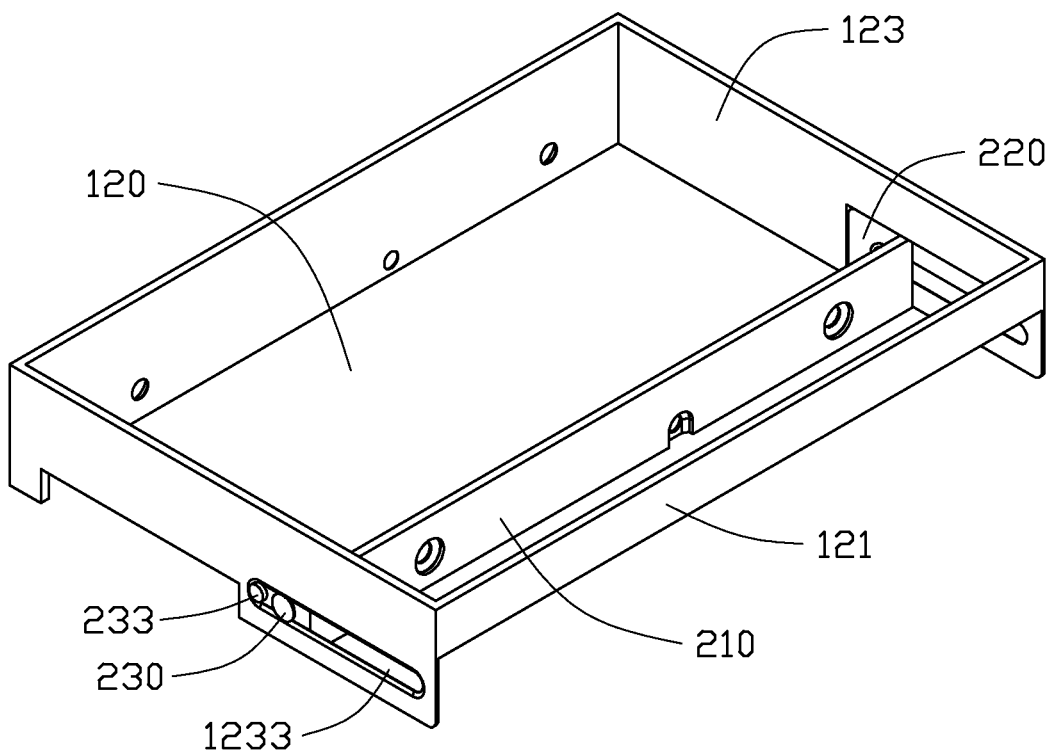
FIG. 5 is an assembled, isometric view of the carrier in FIG. 1 in a second configuration.

Referring to FIG. 5, the carrier 1 is transformed to be a second configuration from the first configuration for installing a second type of hard disk drive. The adjusting mechanism 20 has the retainers 230 sliding a distance in the grooves 1233 of the coupling walls 123 toward the second ends of the grooves 1233 until the protrusions 223 of the coupling portions 220 in the grooves 1233 are blocked by the coupling walls 123. Here, it can be said that the adjusting mechanism 20 is in the second configuration, the adjusting mechanism 20 locates in the first space 110 defined by the frame 10, and the adjusting mechanism 20 and the frame 10 cooperatively define and surround a second space 120 and accommodate a second type of hard disk drive in the second space 120. The second space 120 can be dimensionally different from the first space 110 in size. The second type of hard disk drive can be dimensionally different from the first type of hard disk drive.

Figure 6:
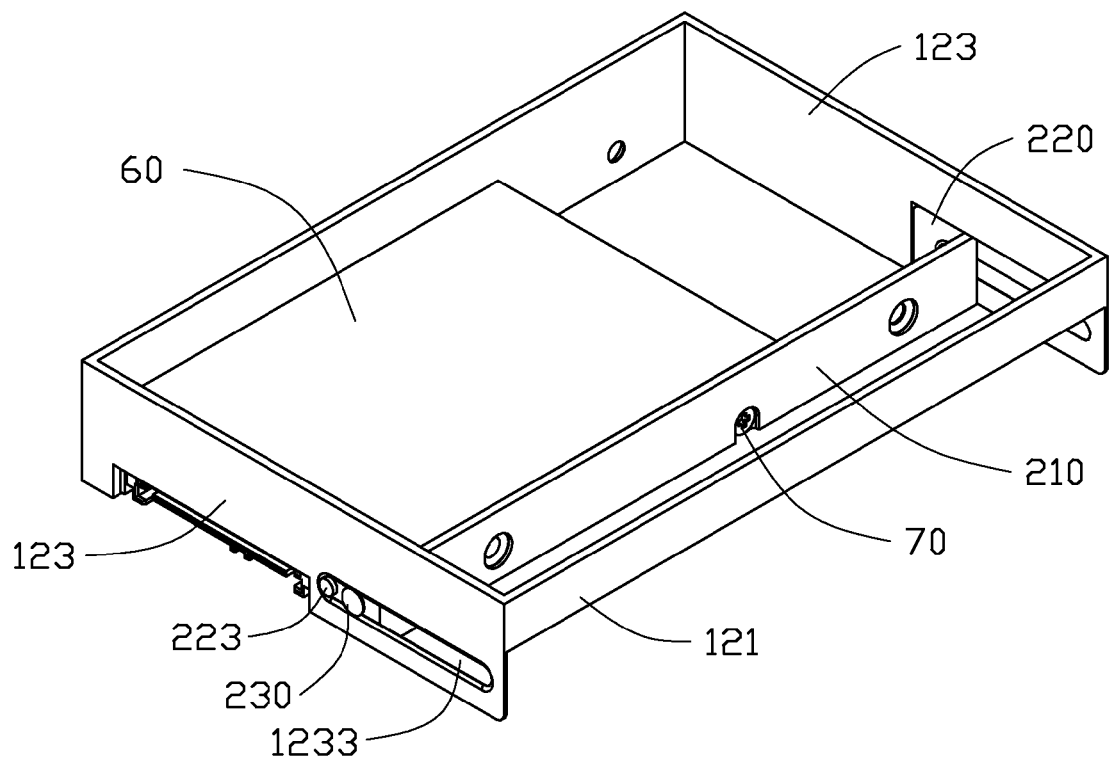
FIG. 6 an assembled, isometric view of the carrier in FIG. 5 with a hard disk drive installed in the carrier.

Referring to FIG. 6 also, the carrier 1 is illustrated for carrying a second type of hard disk drive 60. The second type of hard disk drive 60 is accommodated in the second space 120 cooperatively defined by the frame 10 and the adjusting mechanism 20. Two bolts 70 can extend through the two second type of installing holes 2113 of the installing portion 210 to engage with the second type of hard disk drive 60. Therefore, the second type of hard disk drive 60 is installed in the second configuration cooperatively defined by the frame 10 and the adjusting mechanism 20.

When the adjusting mechanism 20 is transmitted from the second configuration to the first configuration, the adjusting mechanism 20 has the retainers 230 sliding in the grooves 1233 of the coupling walls 123 toward the first ends of the grooves 1233, until the retainers 230 in the grooves 1233 are blocked by the coupling walls 123, and the installing portion 210 of the adjusting mechanism 20 is received in the receiving room 1211 of the connecting wall 210.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A carrier for a hard disk drive comprising:
a frame defining a first space configured to accommodate a first hard disk drive, and an adjusting mechanism slidably coupled to the frame, the adjusting mechanism transitionable between: (i) a first configuration in which the adjusting mechanism is located outside the first space defined by the frame, and (ii) a second configuration in which the adjusting mechanism is located inside the first space, the adjusting mechanism and the frame cooperatively define a second space configured to accommodate a second hard disk drive different from the first hard disk drive;
wherein the adjusting mechanism comprises an installing portion configured for installation of the first hard disk drive or the second hard disk drive, and two coupling portions extending from two opposite ends of the installing portion, the two coupling portions being slidably coupled to the frame; the frame comprises a first connecting wall and a second connecting wall opposite to the first connecting wall, and the first connecting wall defines a receiving room; when the adjusting mechanism is in the first configuration, the installation portion is received in the receiving room and under the first connecting wall, and when the adjusting mechanism is in the second configuration, the installation portion is located between the first connecting wall and the second connecting wall.

2. The carrier of claim 1, wherein the frame comprises two opposite coupling walls connecting the first connecting wall and the second connecting wall; each coupling wall defines a groove, and each of the two coupling portions is slidably coupled to the groove.

3. The carrier of claim 2, wherein the adjusting mechanism further comprises two retainers, each of the retainers being coupled to the coupling portion and a corresponding coupling wall and configured to retain the coupling portion with the coupling wall.

4. The carrier of claim 3, wherein the retainer comprises a sleeve member and a pin member engaged with the sleeve member, the sleeve member and a pin member retaining the coupling portion with the coupling wall.

5. The carrier of claim 4, wherein the sleeve member comprises a first head portion configured to abut the coupling portion and a sleeve portion extending from the head portion, the pin member comprising a second head portion configured to abut the coupling wall and a pin portion engaging in the sleeve portion.

6. The carrier of claim 5, wherein the coupling portion and the coupling wall are located between the corresponding first head portion of the sleeve member and the corresponding second head portion of the pin member.

7. The carrier of claim 3, wherein each of the coupling portions extend a protrusion received in a corresponding groove of the coupling wall.

8. The carrier of claim 3, wherein two coupling walls each define a recess, the coupling portions being received in the recesses of the coupling walls respectively.

9. The carrier of claim 1, wherein adjusting mechanism defines a first installing hole and a second installing hole respectively configured to install the first hard disk drive and the second hard disk drive.

10. A carrier for a hard disk drive comprising:
a frame and an adjusting mechanism slidably coupled to the frame, the frame and the adjusting mechanism cooperatively forming a first configuration configured to accommodate a first hard disk drive, the frame and the adjusting mechanism cooperatively forming a second configuration configured to accommodate a second hard disk drive after sliding the adjusting mechanism a distance from the first configuration;
wherein the adjusting mechanism comprises an installing portion configured for installation of the first hard disk drive or the second hard disk drive, and two coupling portions extending from opposite ends of the installing portion, the two coupling portions being slidably coupled to the frame; the frame comprises a first connecting wall and a second connecting wall opposite to the first connecting wall, and the first connecting wall defines a receiving room; the installation portion is received in the receiving room and is under the first connecting wall when the first configuration is formed, and the installation portion is located between the first connecting wall and the second connecting wall when the second configuration is formed.

11. The carrier of claim 10, wherein the frame comprises two opposite coupling walls connecting the first connecting wall and the second connecting wall; each coupling wall defines a groove, and each of the two coupling portions is slidably coupled to the groove.

12. The carrier of claim 11, wherein the adjusting mechanism further comprises a retainer slidably received in a groove defined in each of the two coupling walls, each of the retainers being coupled to the coupling portion and a corresponding coupling wall and configured to retain the coupling portion with the coupling wall.

13. The carrier of claim 12, wherein a protrusion extends from each of the coupling portions to be received in a corresponding groove of the coupling wall.

* * * * *